United States Patent
Patel et al.

(10) Patent No.: US 11,539,270 B2
(45) Date of Patent: Dec. 27, 2022

(54) CONNECTION ASSEMBLY COVER WITH INTEGRATED ANTI-ROTATION

(71) Applicant: Hamilton Sundstrand Corporation, Charlotte, NC (US)

(72) Inventors: Dhaval Patel, Loves Park, IL (US); Andrew R. Wilkinson, Cherry Valley, IL (US); Andrew P. Grosskopf, Rockford, IL (US); Edward C. Allen, Davis, IL (US); Kyle S. Sirbasku, Rockford, IL (US); Duane C. Johnson, Beloit, WI (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 276 days.

(21) Appl. No.: 16/818,213

(22) Filed: Mar. 13, 2020

(65) Prior Publication Data

US 2021/0288556 A1     Sep. 16, 2021

(51) Int. Cl.
| | | |
|---|---|---|
| *H01C 1/02* | (2006.01) | |
| *H02K 11/00* | (2016.01) | |
| *H01R 13/46* | (2006.01) | |
| *H02K 5/22* | (2006.01) | |
| *H02K 11/04* | (2016.01) | |
| *H01C 10/34* | (2006.01) | |
| *H02K 11/042* | (2016.01) | |

(52) U.S. Cl.
CPC ........... *H02K 11/0094* (2013.01); *H01C 1/02* (2013.01); *H01C 10/34* (2013.01); *H01R 13/46* (2013.01); *H02K 5/225* (2013.01); *H02K 11/042* (2013.01); *H02K 11/046* (2013.01); *H01R 2201/10* (2013.01); *H02K 2203/09* (2013.01)

(58) Field of Classification Search
CPC .......... H01C 1/02; H01C 10/34; H01R 13/46
USPC ......................................................... 338/162
See application file for complete search history.

(56) References Cited

U.S. PATENT DOCUMENTS 3,573,552 A     4/1971   Forfod
3,629,780 A *  12/1971   Burcham ............. H04R 25/603
                                                   338/172

(Continued)

FOREIGN PATENT DOCUMENTS

EP     2773031 A2     9/2014
EP     3681020 A1     7/2020

OTHER PUBLICATIONS

The Extended European Search for Application No. 21158792.8-1201; Report dated Jul. 16, 2021; Report dated Jul. 26, 2021; 9 pages.

*Primary Examiner* — Renee S Luebke
*Assistant Examiner* — Iman Malakooti
(74) *Attorney, Agent, or Firm* — Cantor Colburn LLP

(57) ABSTRACT

A resistor pack assembly including an anti-rotation housing. The anti-rotation housing includes a first surface, a second surface opposite the first surface, one or more anti-rotation lugs extending away from the first surface, and an internal cavity extending from the second surface into the anti-rotation housing towards the first surface. The resistor pack assembly also including a positive rail located at least partially within the internal cavity, a negative rail having an inner circular face and an outer circular face located radially outward from the inner circular face, and an insulator ring is interposed between the second surface of the anti-rotation housing and the outer circular face of the negative rail.

18 Claims, 10 Drawing Sheets

(56) References Cited

U.S. PATENT DOCUMENTS

| | | |
|---|---|---|
| 8,553,379 B2 | 10/2013 | Kasztenny et al. |
| 9,083,177 B2 | 7/2015 | Andersen et al. |
| 10,460,861 B1 | 10/2019 | Patel et al. |
| 2014/0246957 A1* | 9/2014 | Grosskopf ............... H01R 4/48 |
| | | 310/67 R |

* cited by examiner

CONNECTION ASSEMBLY COVER WITH INTEGRATED ANTI-ROTATION

BACKGROUND

The subject matter disclosed herein generally relates to generators, and more specifically to a rotating resistor pack employed in a generator.

A typical generator assembly includes a rotor portion and a stator portion. Mechanical energy is provided to the generator via a shaft connected to the rotor portion that is converted into electrical energy that is provided via the stator portion.

Many generators take advantage of three stages, including a permanent magnet stage, an exciter stage and a main stage. The exciter stage includes an exciter stator winding for receiving direct current (DC) power that energizes the exciter stator and generates the desired magnetic field. Rotational energy provided by the shaft causes the exciter rotor to move through the magnetic field, resulting in the generation of alternating current (AC) electric power in the exciter rotor. A rotating rectifier assembly is mounted within the rotor for converting the AC power to DC electric power that is supplied to the main rotor winding. The DC power provided to the rotating main rotor winding results in a rotating magnetic field that generates AC power in the stator windings.

Suppression resistors may also be included within or nearby the rotating rectifier assembly to provide an alternate path for voltage and current transients and protect the rotating rectifier assembly. However, the rotating rectifier assembly and the suppression resistors are mounted on the rotating shaft, and are therefore subject to the centrifugal forces associated with the rotating shaft.

BRIEF SUMMARY

According to one embodiment, a resistor pack assembly is provided. The resistor pack assembly including an anti-rotation housing. The anti-rotation housing includes a first surface, a second surface opposite the first surface, one or more anti-rotation lugs extending away from the first surface, and an internal cavity extending from the second surface into the anti-rotation housing towards the first surface. The resistor pack assembly also including a positive rail located at least partially within the internal cavity, a negative rail having an inner circular face and an outer circular face located radially outward from the inner circular face, and an insulator ring is interposed between the second surface of the anti-rotation housing and the outer circular face of the negative rail.

In addition to one or more of the features described above, or as an alternative, further embodiments may include that the anti-rotation housing further includes one or more counter bore holes extending from the first surface to the second surface.

In addition to one or more of the features described above, or as an alternative, further embodiments may include that each of the one or more counter bore holes further include a first hole extending from the first surface to a seat and a second hole extends from the seat to the second surface of the anti-rotation housing.

In addition to one or more of the features described above, or as an alternative, further embodiments may include that the first hole has a first diameter and the second hole has a second diameter, the first diameter being greater than the second diameter.

In addition to one or more of the features described above, or as an alternative, further embodiments may include a washer located in the first hole and a fastener extending through the washer, the first hole, and the second hole.

In addition to one or more of the features described above, or as an alternative, further embodiments may include that the washer is a Belleville washer.

According to another embodiment, a generator having a plurality of rotating components that rectify an alternating current (AC) voltage to a direct current (DC) voltage supplied to main field windings is provided. The generator including a rotor shaft having an inner diameter and a rectifier assembly located within the inner diameter of the rotor shaft and connected to convert the AC voltage to a rectified DC voltage supplied via a first round contact bus bar that extends axially away from the rectifier assembly and a second round contact bus bar that extends axially away from the rectifier assembly. The rectifier assembly including one or more notches. The generator further including a resistor pack assembly located axially adjacent to the rectifier assembly and within the inner diameter of the rotor shaft, wherein the resistor pack assembly receives the DC voltage supplied by the first round contact bus bar and the second round contact bus bar. The resistor pack assembly communicates the DC voltage to a main field winding. The resistor pack assembly includes: an anti-rotation housing including a first surface, a second surface opposite the first surface, and one or more anti-rotation lugs extending away from the first surface. The one or more anti-rotation lugs engage with the notches of the rectifier assembly.

In addition to one or more of the features described above, or as an alternative, further embodiments may include that the resistor pack assembly further includes a positive rail, a negative rail having an inner circular face and an outer circular face located radially outward from the inner circular face, and an insulator ring is interposed between the second surface of the anti-rotation housing and the outer circular face of the negative rail.

In addition to one or more of the features described above, or as an alternative, further embodiments may include that the anti-rotation housing further includes: an internal cavity extending from the second surface into the anti-rotation housing towards the first surface. The positive rail is located at least partially within the internal cavity.

In addition to one or more of the features described above, or as an alternative, further embodiments may include that the anti-rotation housing further includes one or more counter bore holes extending from the first surface to the second surface.

In addition to one or more of the features described above, or as an alternative, further embodiments may include that each of the one or more counter bore holes further include a first hole extending from the first surface to a seat and a second hole extends from the seat to the second surface of the anti-rotation housing.

In addition to one or more of the features described above, or as an alternative, further embodiments may include that the first hole has a first diameter and the second hole has a second diameter. The first diameter being greater than the second diameter.

In addition to one or more of the features described above, or as an alternative, further embodiments may include that the resistor pack assembly further includes a washer located in the first hole and a fastener extending through the washer, the first hole, and the second hole.

In addition to one or more of the features described above, or as an alternative, further embodiments may include that the washer is a Belleville washer.

According to another embodiment, an anti-rotation housing for use in a resistor pack assembly is provided. The anti-rotation housing including a first surface, a second surface opposite the first surface, and one or more anti-rotation lugs extending away from the first surface.

In addition to one or more of the features described above, or as an alternative, further embodiments may include an internal cavity extending from the second surface into the anti-rotation housing towards the first surface.

In addition to one or more of the features described above, or as an alternative, further embodiments may include one or more counter bore holes extending from the first surface to the second surface.

In addition to one or more of the features described above, or as an alternative, further embodiments may include that each of the one or more counter bore holes further include a first hole extending from the first surface to a seat and a second hole extends from the seat to the second surface of the anti-rotation housing.

In addition to one or more of the features described above, or as an alternative, further embodiments may include that the first hole has a first diameter and the second hole has a second diameter. The first diameter being greater than the second diameter.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

FIG. 6A is an exploded view of a resistor housing washer and a housing that was previously utilized a resistor pack assembly;

DETAILED DESCRIPTION

A detailed description of one or more embodiments of the disclosed apparatus and method are presented herein by way of exemplification and not limitation with reference to the Figures.

Figure 1:
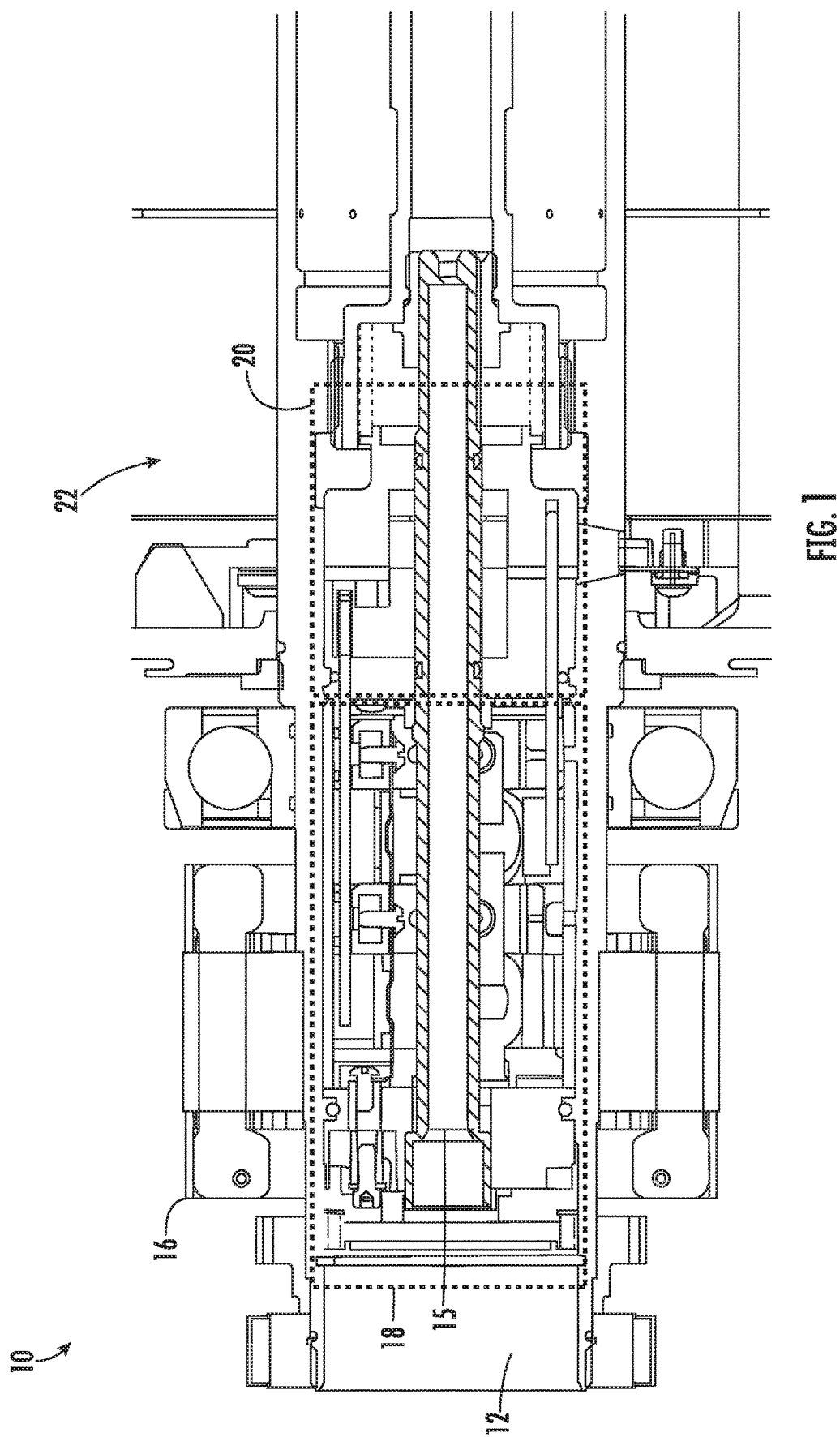
FIG. 1 is a cross-sectional view of rotating components included in a variable frequency generator, according to an embodiment of the present disclosure.

Referring now to FIG. 1, a cross-sectional view of rotating components included in a generator 10. The generator 10 includes a rotor shaft 12, an exciter rotor 16, a rectifier assembly 18, a resistor pack assembly 20, a main field winding 22, and an oil transfer tube 15 extending between the rectifier assembly 18 and the resistor pack assembly 20. The rotor shaft 12 communicates mechanical energy to the rotating components mounted on the rotor shaft 12, including the exciter rotor 16, the rectifier assembly 18, the resistor pack assembly 20, and the main field winding 22.

DC voltage is supplied to the stator windings (not shown) located adjacent to the exciter rotor 16. The exciter rotor 16 rotates with the rotor shaft 12, and generates an AC voltage in response to a magnetic field generated by an exciter stator (not shown) located adjacent to the exciter rotor 16. The AC voltage is supplied to the rectifier assembly 18, which rectifies the AC voltage to a rectified DC voltage. The resistor pack assembly 20 receives the rectified DC voltage, and communicates the rectified DC voltage to the main field winding 22.

Both the rectifier assembly 18 and the resistor pack assembly 20 are mounted within an inner diameter of the rotor shaft 12, and are therefore subjected to centrifugal forces associated with the rotation of the rotor shaft 12. A benefit of locating the rectifier assembly 18 and the resistor pack assembly 20 within the inner diameter of the rotor shaft 12, is that the rectifier assembly 18 and the resistor pack assembly 20 are structurally supported by the rotor shaft 12. Locating components within the inner diameter (ID) of the rotor shaft 12 forces the rotor shaft 12 to a certain size to accommodate the components and adds to the stiffness of the rotor shaft 12. Increased shaft stiffness increases a maximum obtainable speed of the rotor shaft 12.

Figure 2:
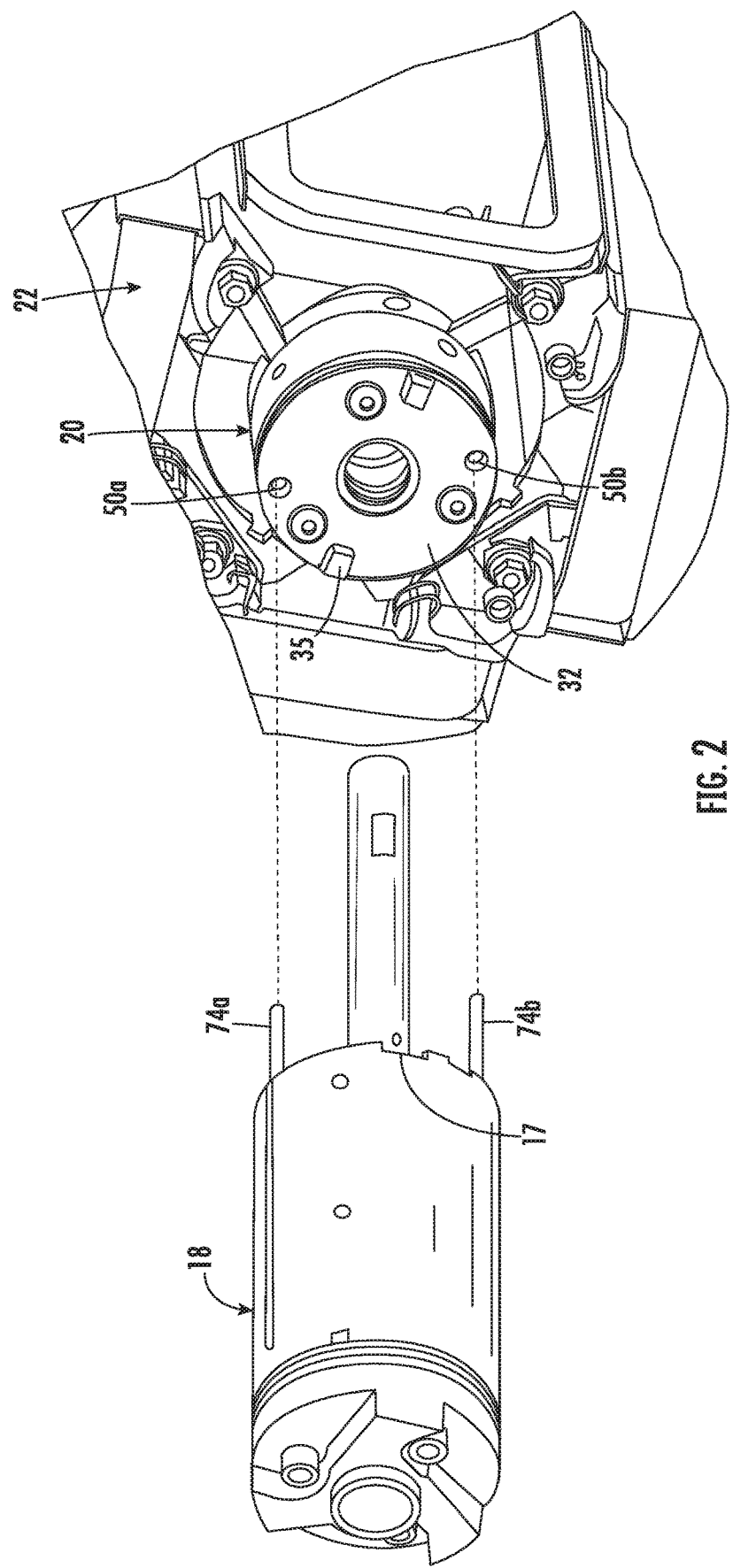
FIG. 2 is an exploded view that illustrates the connection of a rectifier assembly to a resistor pack assembly of the variable frequency generator of FIG. 1, according to an embodiment of the present disclosure.

Referring now to FIG. 2, with continued reference to FIG. 1, an exploded view that illustrates the connection of the rectifier assembly 18 to the resistor pack assembly 20 is shown, according to an embodiment of the present disclosure. In the embodiment shown in FIG. 2, the resistor pack assembly 20 is shown mounted within main field winding 22, but with the rotor shaft 12 removed from the view to prevent obscuration of the resistor pack assembly 20. The rectifier assembly 18 includes a first round contact bus bar 74a and a second round contact bus bar 74b extending axially away from rectifier assembly 18. As described below, the first round contact bus bar 74a and the second round contact bus bar 74b are received by power bands (e.g., power band 70 and power band 73 shown in FIG. 5) located within connection orifices 50a and 50b, respectively. The oil transfer tube 15 (located within the rectifier assembly 18 in FIG. 2) is received by a central orifice 39 of an anti-rotation housing 32 of the resistor pack assembly 20. One or more anti-rotation lugs 35 on the anti-rotation housing 32 are configured to engage with one or more notches 17 on the rectifier assembly 18. Engagement of the anti-rotation lugs 35 with the notches 17 prevents the resistor pack assembly 20 from rotating relative to the rectifier assembly 18.

Figure 3:
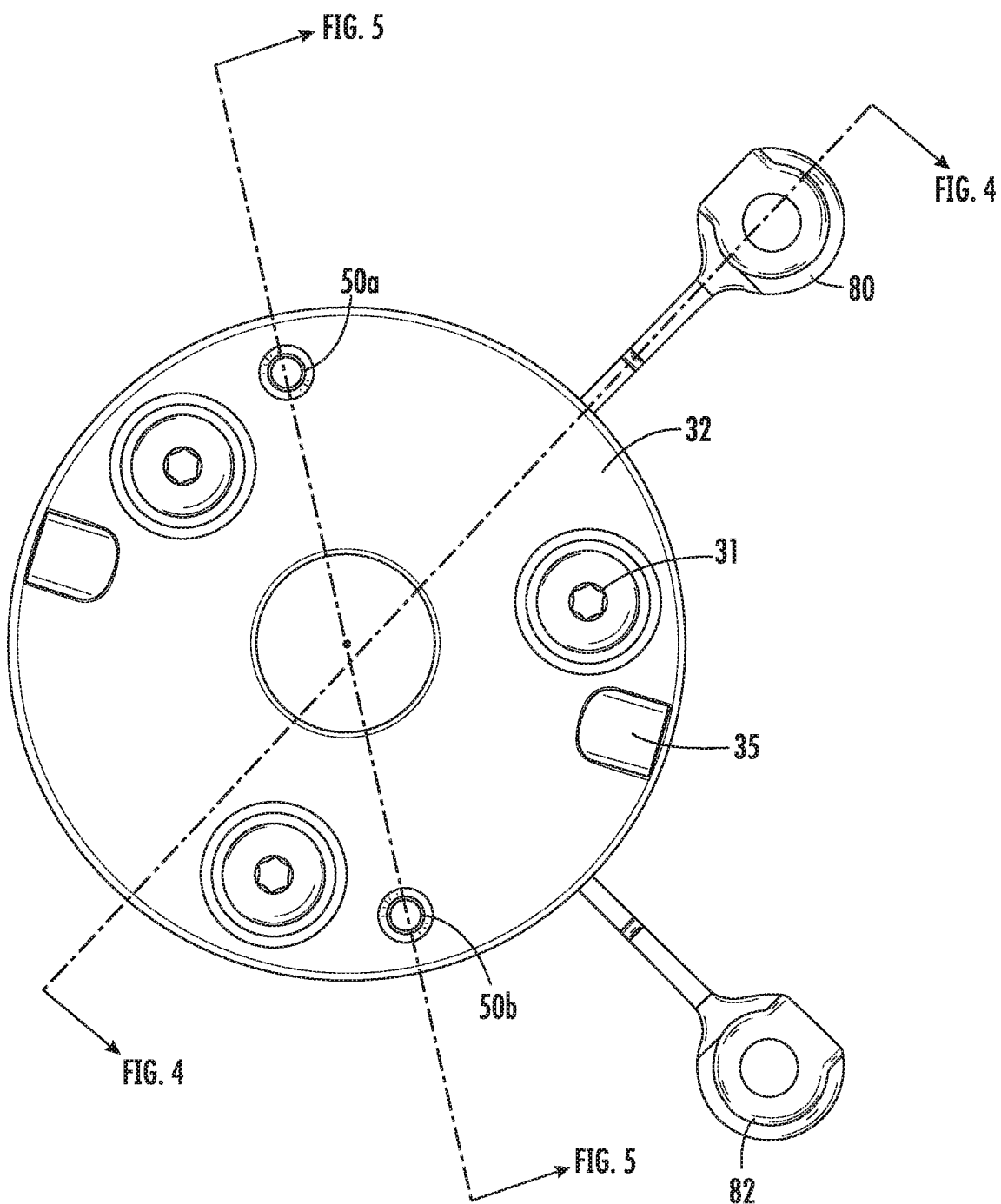
FIG. 3 is an axial view of the resistor pack assembly, according to an embodiment of the present disclosure.

Referring now to FIG. 3, with continued reference to FIGS. 1-2, an axial view of the resistor pack assembly 20 is illustrated, in accordance with an embodiment of the present disclosure. In the embodiment shown in FIG. 3, the resistor pack assembly 20 includes a first DC bus bar 80 and a second DC bus bar 82. The first DC bus bar 80 and the second DC bus bar 82 electrically connects to the main field winding 22. Also visible in FIG. 3 are fasteners 31 utilized to press the components of the resistor pack assembly 20 into abutment with one another, securing those components that are not fastened, as discussed further below. Also visible in FIG. 3, are the anti-rotation lugs 35 on the anti-rotation housing 32. In an embodiment, there are two anti-rotation lugs 35, as illustrated in FIG. 3.

Figure 4:
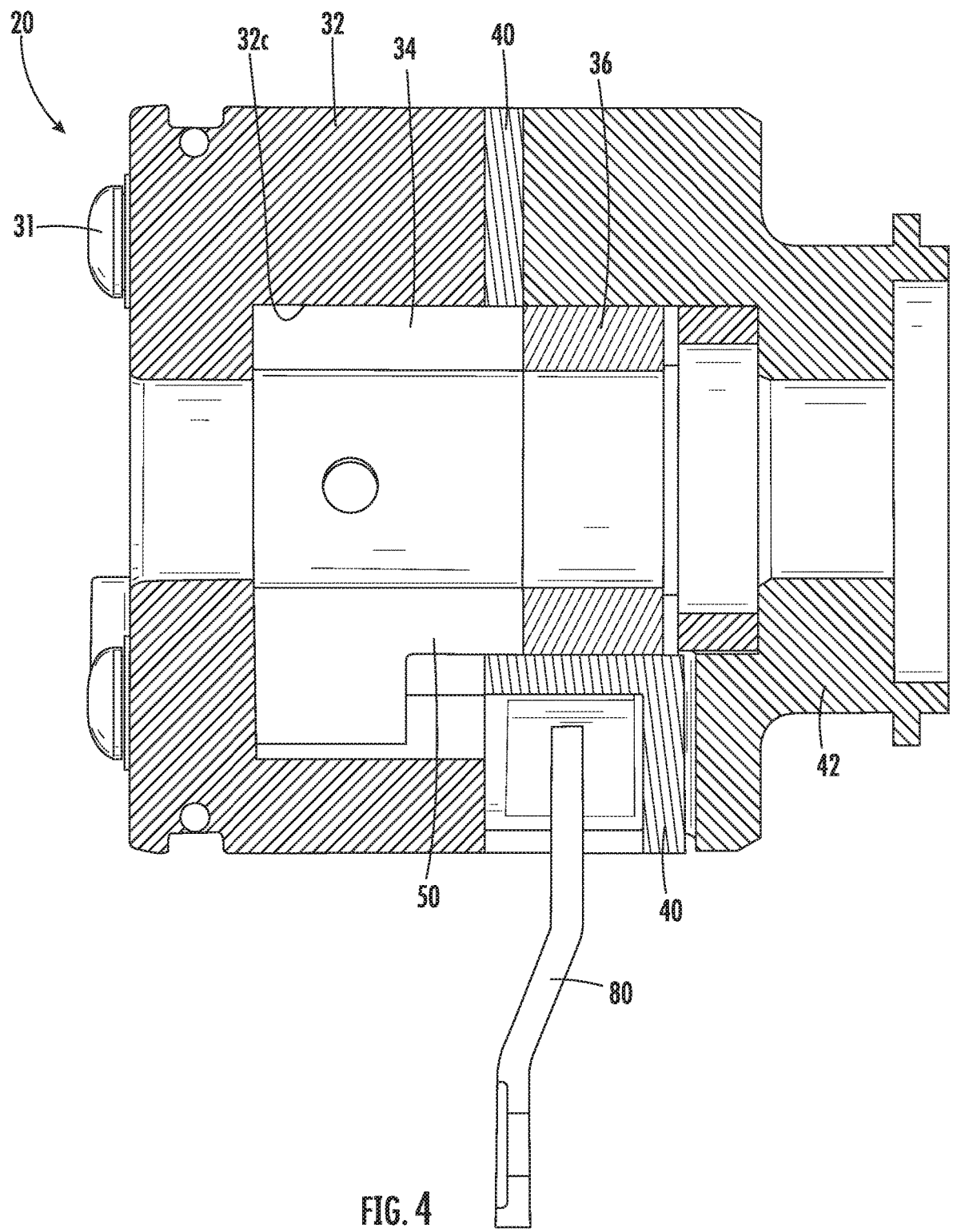
FIG. 4 is a cross-sectional view of the resistor pack assembly, according to an embodiment of the present disclosure.

Referring now to FIG. 4, with continued FIG. 1-3, a cross-sectional view of the resistor pack assembly 20 is illustrated, according to an embodiment of the present disclosure. The resistor pack assembly 20 includes an anti-rotation housing 32, a positive rail 34, a cylindrical suppression resistor 36, an insulator ring 40, and a negative rail 42. The negative rail 42 also serves as a structural base for the resistor pack assembly 20. Components included within resistor pack assembly 20 are sandwiched in place between anti-rotation housing 32 and negative rail 42. In particular, cylindrical suppression resistor 36 is interposed between the positive rail 34 and the negative rail 42. The positive rail 34 is also at least partially located within the internal cavity 32c of the anti-rotation housing 32.

The suppression resistor 36 provides a ground fault path through rotor shaft 12 that prevents a build-up of charge on the main field windings that can damage the diodes in rectifier assembly 18 when discharged. In the embodiment, the suppression resistor 36 is a ceramic resistor, although in other embodiments various materials may be employed.

The resistor pack assembly 20 is held in place via fasteners 31 (e.g., bolts) connected through the anti-rotation housing 32, the insulator ring 40, and the negative rail 42. In this way, cylindrical suppression resistor 36 is held in place between the positive rail 34 and the negative rail 42.

Figure 5:
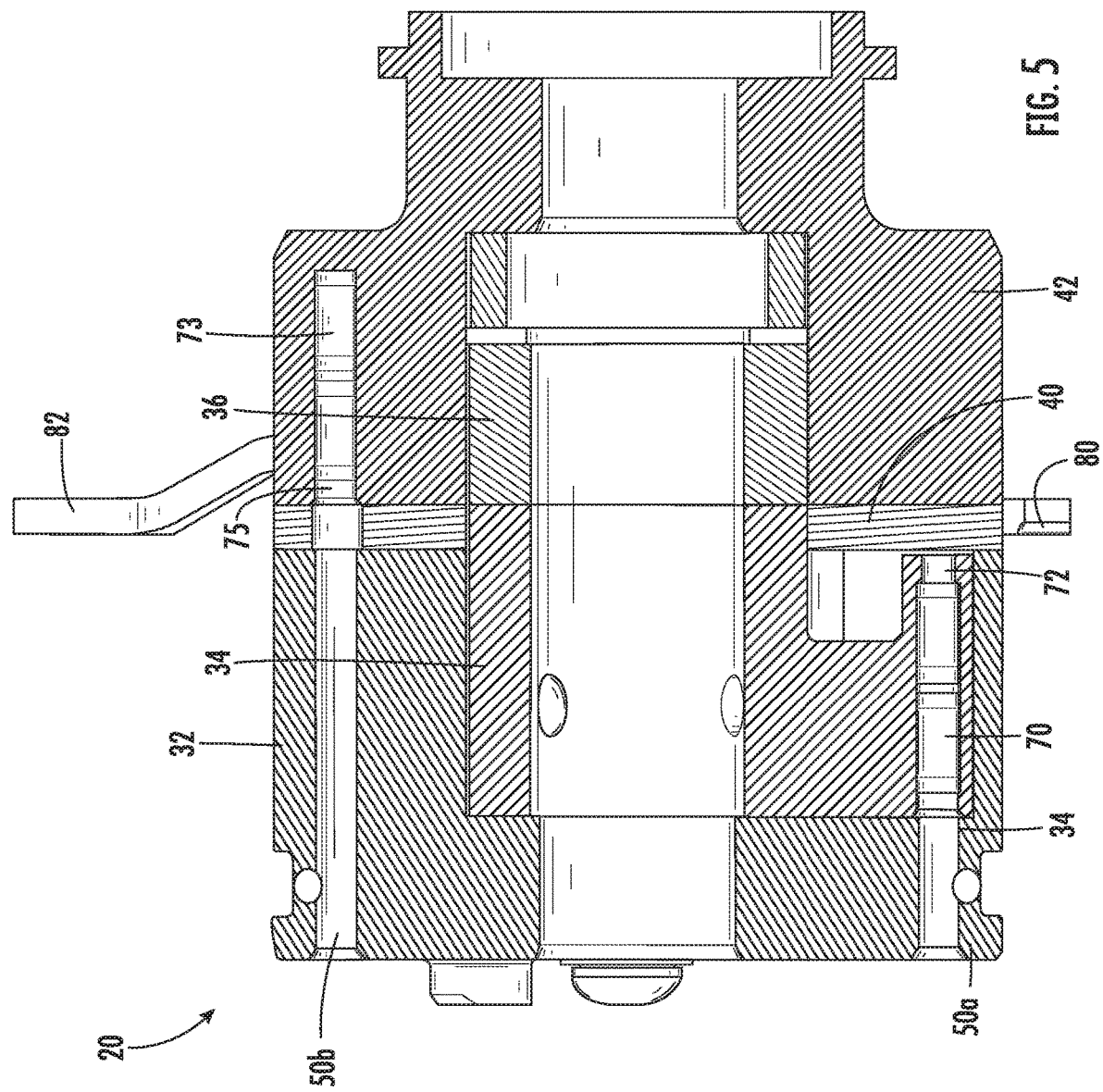
FIG. 5 is a cross-sectional view of the resistor pack assembly, according to an embodiment of the present disclosure.

Referring now to FIG. 5, with continued FIG. 1-4, a cross-sectional view of the resistor pack assembly 20 is illustrated, according to an embodiment of the present disclosure. The resistor pack assembly 20 once again includes the anti-rotation housing 32, the positive rail 34, the cylindrical suppression resistor 36, the insulator ring 40, and the negative rail 42.

FIG. 5 illustrates the placement of power band 70 within the connection orifice 50a. The connection orifice 50a extends through the anti-rotation housing 32, the positive rail 34, and the insulator ring 40, as shown in FIG. 5. The power band 70 is a hollow sleeve that fits within the sleeve-like aperture (e.g., sleeve) 72 of the connection orifice 50a. The sleeve-like aperture 72 is located in the positive rail 34. The power band 70 is a conductor that is configured to receive the first round contact bus bar 74a (shown in FIG. 2) associated with rectifier assembly 18. The axial extending connection orifice 50a with the power band 70 allows the rectifier assembly 18 to be electrically connected to the resistor pack assembly 20 simply by sliding the first round contact bus bar 74a (shown in FIG. 2) into engagement with power band 70.

FIG. 5 also illustrates the placement of power band 73 within connection orifice 50b. The connection orifice 50b extends through the anti-rotation housing 32, the insulator ring 40, and the negative rail 42, as shown in FIG. 5. The power band 73 is a hollow sleeve that fits within the sleeve-like aperture (e.g., sleeve) 75 of the connection orifice 50b. The sleeve-like aperture 75 is located in the negative rail 42. The power band 73 is a conductor that is configured to receive the second round contact bus bar 74b (shown in FIG. 2) associated with rectifier assembly 18. The axial extending connection orifice 50b with the power band 73 allows the rectifier assembly 18 to be electrically connected to the resistor pack assembly 20 simply by sliding the second round contact bus bar 74b (shown in FIG. 2) into engagement with power band 73.

Figure 6:
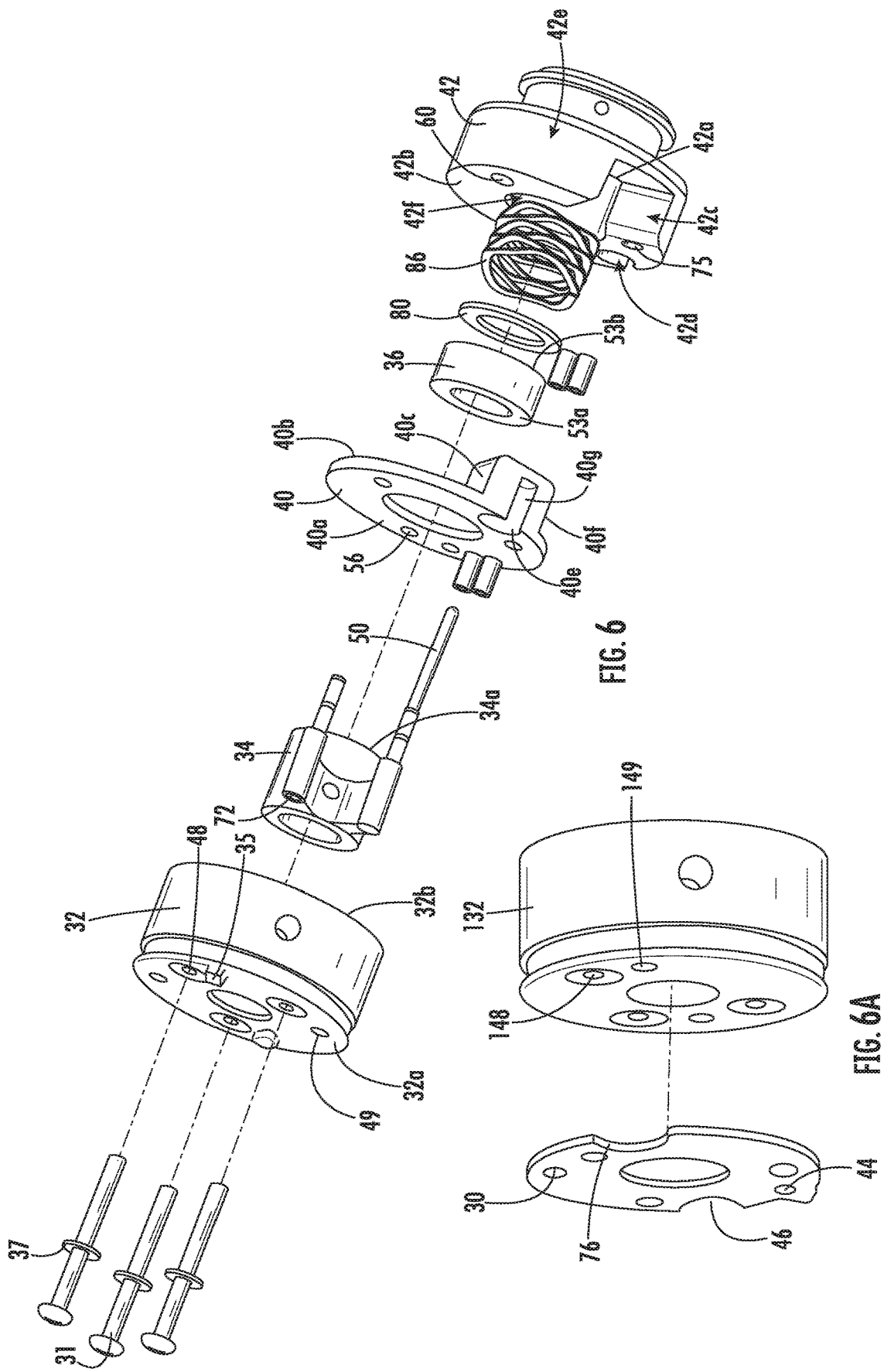
FIG. 6 is an exploded view of the resistor pack assembly, according to an embodiment of the present disclosure.

Referring now to FIGS. 6 and 6A, with continued reference to FIGS. 1-5, an exploded view of the resistor pack assembly 20 is illustrated, according to an embodiment of the present disclosure. In the embodiment shown in FIG. 6, the resistor pack assembly 20 once again includes the anti-rotation housing 32, the positive rail 34, the cylindrical suppression resistor 36, the insulator ring 40, and the negative rail 42.

Advantageously, the anti-rotation housing 32 illustrated in FIG. 6 is a single component that replaces two previously utilized components illustrated in FIG. 6A. Specifically, the anti-rotation housing 32 replaces a resistor housing washer 30 and a housing 132, as illustrated in FIG. 6A. The resistor housing washer 30 includes one or more apertures 44 for receiving fasteners 31 (e.g., bolts) that were previously used for securing components of the resistor pack assembly 20 together. In addition, the resistor housing washer 30 includes clearance slots 46 for receiving the first round contact bus bar 74a and the second contact bus bar 74b (shown in FIG. 2) associated with rectifier assembly 18. The housing 132 was located adjacent to the resistor housing washer 30. The housing 132 included one or more apertures 148 for receiving fasteners 31 and one or more apertures 149 for receiving the first round contact bus bar 74a and the second contact bus bar 74b (shown in FIG. 2) associated with the rectifier assembly 18.

Referring now to the anti-rotation housing 32 incorporated into the embodiment of the present disclosure, as illustrated in FIG. 6. The anti-rotation housing 32 includes a first surface 32a and a second surface 32b opposite the first surface 32a. The anti-rotation housing 32 includes one or more counter bore holes 48 configured to receive fasteners 31 and washers 37 of fasteners 31. In an embodiment, the washers 37 are Belleville Washers that spring and/or lock into place. The counter bore holes 48 initiate at the first surface 32a and extend into the anti-rotation housing 32 to the second surface 32b. The anti-rotation housing 32 also includes apertures 49 in the first surface 32a for receiving the first round contact bus bar 74a and the second contact bus bar 74b (shown in FIG. 2) associated with the rectifier assembly 18. The apertures 49 extend into the anti-rotation housing 32. The anti-rotation housing 32 also includes one or more anti-rotation lugs 35 extending away from the first face 33a and protruding from the anti-rotation housing 32. In an embodiment, the anti-rotation housing 32 is composed of a non-metallic material and/or non-conductive, such as for example, plastic. The anti-rotation housing 32 includes a central orifice 39 configured to receive the oil transfer tube 15. The central orifice 39 extends from the first surface 32a to the internal cavity 32c (shown in FIG. 4). The internal cavity 32c extends from the second surface 32b into the anti-rotation housing 32 towards the first surface 32a.

The positive rail 34 is located adjacent to the anti-rotation housing 32 and includes a circular face 34a and a connection terminal 50. The positive rail 34 is also located at least partially within the anti-rotation housing 32, as shown in FIG. 2. The connection terminal 50 extends axially away from the circular face 34a of the positive rail 34. The positive rail 34 also includes the sleeve-like aperture (e.g., sleeve) 72 of the connection orifice 50a, as discussed in relation to FIG. 5 above.

The cylindrical suppression resistor 36 is located between the positive rail 34 within a circular orifice 42f of the negative rail 42, as shown in FIGS. 4-6. The cylindrical suppression resistor 36 includes a first flat surface 53a and a second flat surface 53b opposite the first flat surface 53a. In the embodiment shown in FIG. 6, cylindrical suppression resistor 36 is cylindrical, and does not include apertures for receiving the fasteners 31. Rather, cylindrical suppression resistor 36 is sandwiched in place between the circular face 34a of the positive rail 34 and a washer 80. The contact between the circular face 34a and the first flat surface 53a of the cylindrical suppression resistor 36 provides an electrical connection between the positive rail 34 and cylindrical suppression resistor 36. Sandwiched between the washer 80 and an inner circular face 42a of the negative rail 42 is a retention spring 86. The inner circular face 42a serves as a base for the circular orifice 42f. As illustrated in FIG. 6, the inner circular face 42a is located radially inward from the outer circular face 42b. As also illustrated in FIG. 6, the inner circular face 42a is located axially offset from the outer circular face 42b.

The insulator ring 40 is located adjacent to the anti-rotation housing 32 and the negative rail 42. In other words, the insulator ring 40 is interposed between the anti-rotation housing 32 and the negative rail 42. More specifically, the insulator ring 40 is interposed between the second surface 32b of the anti-rotation housing 32 and an outer circular face 42b of the negative rail 42. The insulator ring 40 includes a first circular face 40a and a second circular face 40b opposite the first circular face 40a. The first circular face 40a contacts the second surface 32b of the anti-rotation housing 32 and the second circular face 40b contacts the outer circular face 42b of the negative rail 42. The cylindrical suppression resistor 36 is located radially inward from the insulator ring 40, as shown in FIG. 4.

The insulator ring 40 includes one or more apertures 56 for receiving the fasteners 31 provided through the anti-rotation housing 32. The fasteners 31 are secured to the negative rail 42 via apertures 60 and press the components of resistor pack assembly 20 into abutment with one another, securing the components of resistor pack assembly 20 together.

The insulator ring 40 includes a projection portion 40c that projects away from the second circular face 40b. The projection portion 40c mates with a notch 42c located in the negative rail 42 when the components of resistor pack assembly 20 are pressed into abutment with one another. The notch 42c is configured to receive the projection portion 40c. The insulator ring 40 also includes a first bus bar reception cavity 40g located on a radially outward surface 40f of the projection portion 40c. In an embodiment, the first bus bar reception cavity 40g is a positive rail/terminal/reception point and a second bus bar reception cavity 42d in the negative rail 42 is a negative rail/terminal/reception point. The first bus bar reception cavity 40g is configured to receive a first DC bus bar 80 (see FIGS. 2 and 4). The first DC bus bar 80 is secured within the first bus bar reception cavity 40g. The first DC bus bar 80 is at least partially located within the first bus bar reception cavity 40g. The first bus bar reception cavity 40g electrically connects the insulator ring 40 to the first DC bus bar 80.

The insulator ring 40 also includes a receiving orifice 40e located on the first circular face 40a and extending into the insulator ring 40 into the projection portion 40c. The receiving orifice 40e is configured to receive the connection terminal 50 of the positive rail 34 when the components of resistor pack assembly 20 are pressed into abutment with one another. Advantageously, by locating the receiving orifice 40e opposite the projection portion 40c this increases dielectric separation. The electrical current does not flow through the insulator ring 40. The electrical current in the resistor pack assembly 20 flows from the first round contact bus bar 74a to the negative rail 42 to the second DC bus bar 82 to the main field winding 22 to the first DC bus bar 80 to the second round contact bus bar 74b.

The negative rail 42 is located adjacent to the insulator ring 40 and the cylindrical suppression resistor 36. The negative rail 42 provides an electrical path to ground (typically a high resistance). In an embodiment, the rotor shaft 12 is grounded, and the negative rail 42 provides an electrical path to rotor shaft 12 to prevent an undesirable build-up of charge within rectifier assembly 18. The negative rail 42 may be composed of a material, such as, for example aluminum alloy, copper alloy, beryllium copper, or aluminum copper alloys. The negative rail 42 also includes the sleeve-like aperture (e.g., sleeve) 75 of the connection orifice 50b, as discussed in relation to FIG. 5 above.

The negative rail 42 also includes a second bus bar reception cavity 42d located on a radially outward surface 42e of the negative rail 42 and extends into the negative rail 42. The second bus bar reception cavity 42d is configured to receive a second DC bus bar 82 (see FIGS. 3 and 5). The second DC bus bar 82 is secured within the second bus bar reception cavity 42d. The second DC bus bar 82 is at least partially located within the second bus bar reception cavity 42d. The second bus bar reception cavity 42d electrically connects the negative rail 42 to the second DC bus bar 82.

The negative rail 42 includes one or more apertures 60 for receiving the fasteners 31 provided through the anti-rotation housing 32, and insulator ring 40. The fasteners 31 secure to the negative rail 42 and press the components of the resistor pack assembly 20 into abutment with one another, securing those components that are not fastened. The fasteners 31 may be secured to the negative rail 42 via internal threads within the apertures 60 or anchors (not shown) located in the apertures 60. In an embodiment, the anchors may be helical inserts or a threaded insert such as a Keensert. The counter bore holes 48 in the anti-rotation housing 32 align with the apertures 56 in the insulator ring 40, and the apertures 60 in the negative rail 42. The fasteners 31 are located within the counter bore holes 48 in the anti-rotation housing 32, the apertures 56 in the insulator ring 40, and the apertures 60 in the negative rail 42.

Figure 7:
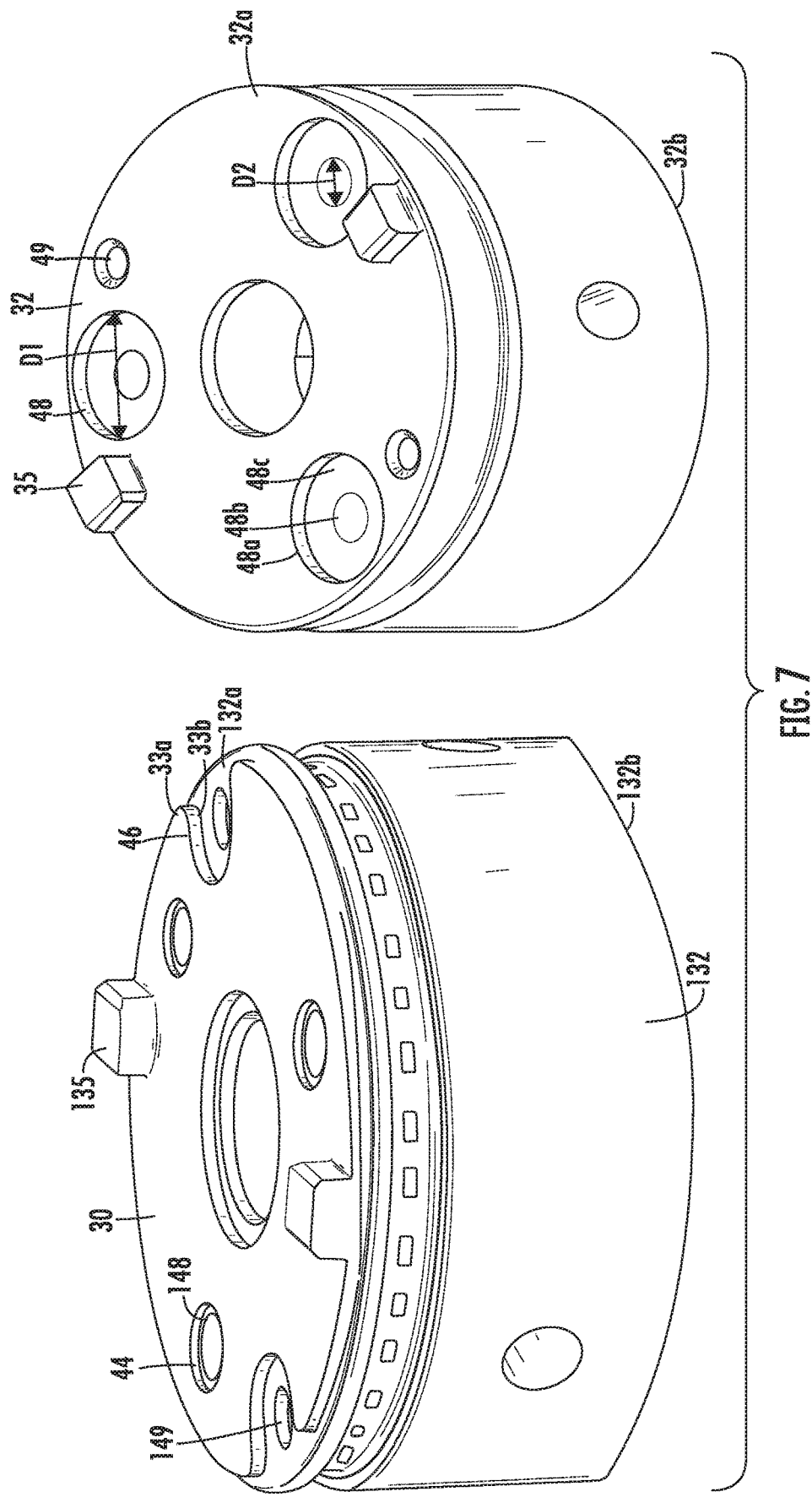
FIG. 7 is a view of a housing and resistor housing washer used in prior embodiments compared to an anti-rotation housing of the resistor pack assembly compared according to an embodiment of the present disclosure.

Referring now to FIG. 7, with continued reference to FIG. 1-6, the anti-rotation housing 32 used in the present embodiment is compared with the combination of the housing 132 and the resistor housing washer 30 that was previously used in other designs are illustrated.

Referring first to the combination of the housing 132 and the resistor housing washer 30 that was used on previous embodiments. The resistor housing washer 30 comprises a first face 33a and a second face 33b opposite the first face 33a. The resistor housing washer 30 includes one or more apertures 44 for receiving fasteners 31 (e.g., bolts, see FIG. 6) that were used for securing components of the resistor pack assembly 20 together. The apertures 44 extend from the first face 33a to the second face 33b.

In addition, the resistor housing washer 30 includes one or more clearance slots 46 for receiving the first round contact bus bar 74a and the second contact bus bar 74b (shown in FIG. 2) associated with rectifier assembly 18. The clearance slots 46 extend from the first face 33a to the second face 33b. The resistor housing washer 30 also includes one or more anti-rotation lugs 135 extending away from the first face 33a.

The housing 132 is located adjacent to the resistor housing washer 30. The housing 132 includes a first surface 132a and a second surface 132b opposite the first surface 132a. The second face 33b of the resistor housing washer 30 is flush with the first surface 132a of the housing 132, as illustrated in FIG. 7.

The housing 132 includes one or more apertures 148 in the first surface 132a for receiving fasteners 31. The housing 132 includes one or more apertures 149 in the first surface 132a for receiving the first round contact bus bar 74a and the second contact bus bar 74b (shown in FIG. 2) associated with the rectifier assembly 18. The apertures 148, 149 extend into the anti-rotation housing 32. The apertures 44 of the resistor housing washer 30 align with the apertures 148 of the housing 132. The clearance slots 46 of the resistor housing washer 30 align with the apertures 149 of the anti-rotation housing 32.

Referring now to the anti-rotation housing 32 incorporated into the embodiment of the present disclosure. The anti-rotation housing 32 includes a first surface 32a and a second surface 32b opposite the first surface 32a. The anti-rotation housing 32 includes one or more counter bore holes 48 configured to receive fasteners 31 and washers 37 of fasteners 31. In an embodiment, the washers 37 are Belleville washers. The counter bore holes 48 initiate at the first surface 32a and extend into the anti-rotation housing 32 to the second surface 32b. The anti-rotation housing 32 also includes apertures 49 in the first surface 32a for receiving the first round contact bus bar 74a and the second contact bus bar 74b (shown in FIG. 2) associated with the rectifier assembly 18. The apertures 49 extend into the anti-rotation housing 32. The anti-rotation housing 32 also includes one or more anti-rotation lugs 35 extending away from the first face 32a and protruding from the anti-rotation housing 32. In an embodiment, the anti-rotation housing 32 is composed of a non-metallic material and/or non-conductive, such as for example, plastic. The anti-rotation housing 32 includes a central orifice 39 configured to receive the oil transfer tube 15. The central orifice 39 extends from the first surface 32a to the internal cavity 32c. The internal cavity 32c extends from the second surface 32b into the anti-rotation housing 32 towards the first surface 32a.

The counter bore holes 48 are composed of two parts including a first hole 48a with a first diameter D1 and a second hole 48b with a second diameter D2. The first diameter D1 is greater than the second diameter D2. The first hole 48a extends from the first surface 32a to a seat 48c and the second hole 48b extends from the seat 48c to the second surface 32b of the anti-rotation housing 32. The seat 48c may be parallel with the first surface 32a. The fastener 31 extends through the washer 37, the first hole 48a, and the second hole 48b.

Advantageously, the first holes 48a gives the washers 37 (e.g., Belleville washers) a surface to compress against, while also allowing for another standard washer to be placed under the washer 37.

Utilization of the anti-rotation housing 32 over the combination of the of the housing 132 and the resistor housing washer 30 provides several benefits, which includes cost reductions by completely eliminating the resistor housing washer 30. Additionally, the resistor housing washer 30 was conventionally composed of metal and thus removing the resistor housing washer 30 removes a metal component from the overall assembly, which helps increase the dielectric capability of the resistor pack assembly 20. Advantageously, the first holes 48a give the washers 37 (e.g., Belleville Washers) a surface to compress against, while also allowing for a dielectric clearance to be set up by eliminating the clearance (i.e., strike) path between the clearance slots 46 and the round contact bus bars 74a, 74, which increases the creepage path.

Figure 8:
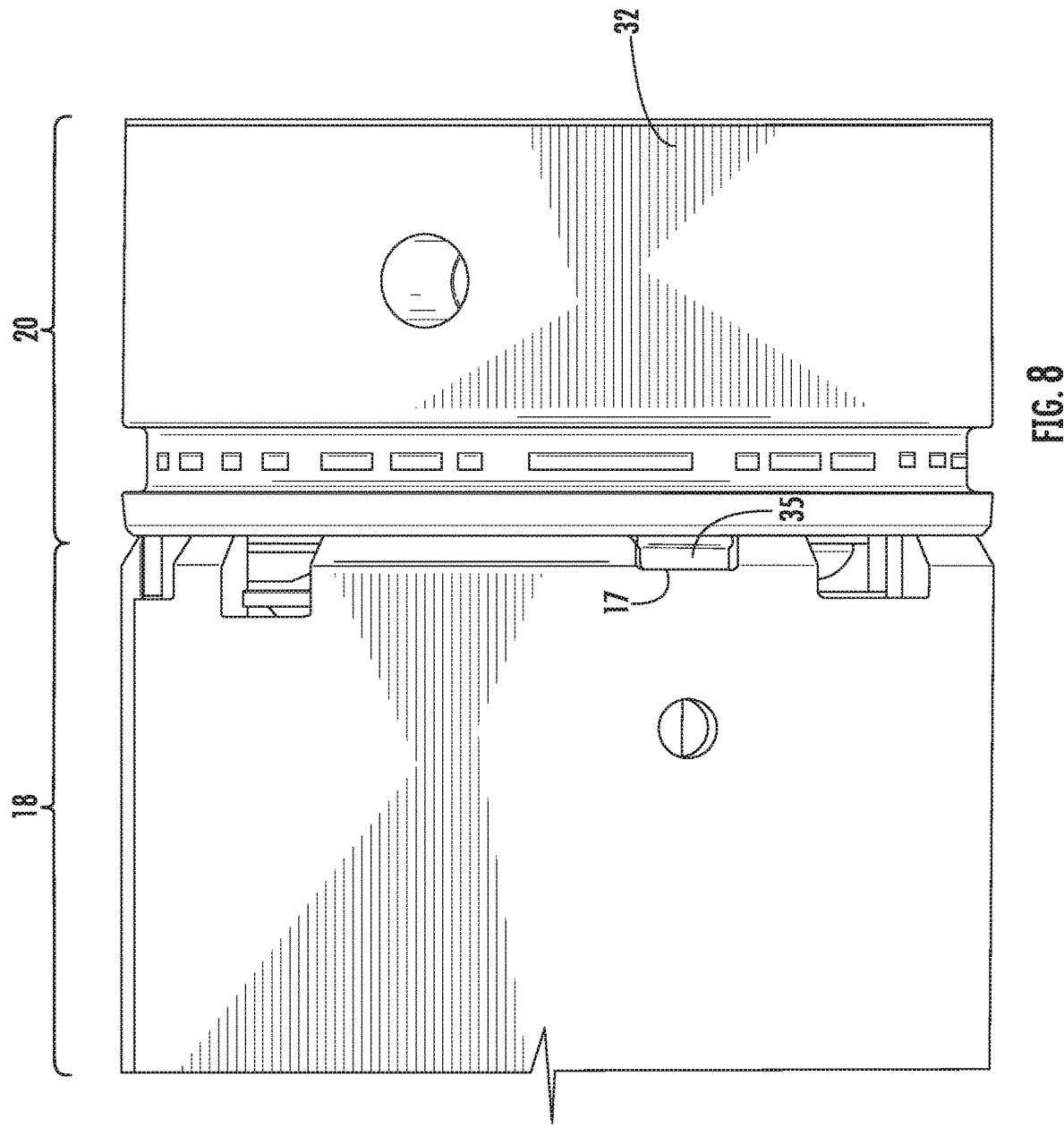
FIG. 8 is a view of the anti-rotation housing of the resistor pack assembly engaged with the rectifier assembly, according to an embodiment of the present disclosure.

Referring now to FIG. 8, with continued reference to FIG. 1-7, a connection between the rectifier assembly 18 and the resistor pack assembly 20 is illustrated in accordance with an embodiment of the present disclosure. As illustrated in FIG. 8, the anti-rotation lugs 35 of the anti-rotation housing 32 are configured to engage or interlock with one or more notches 17 of the rectifier assembly 18 to prevent rotation of the resistor pack assembly 20 relative to the rectifier assembly 18.

Figure 9:
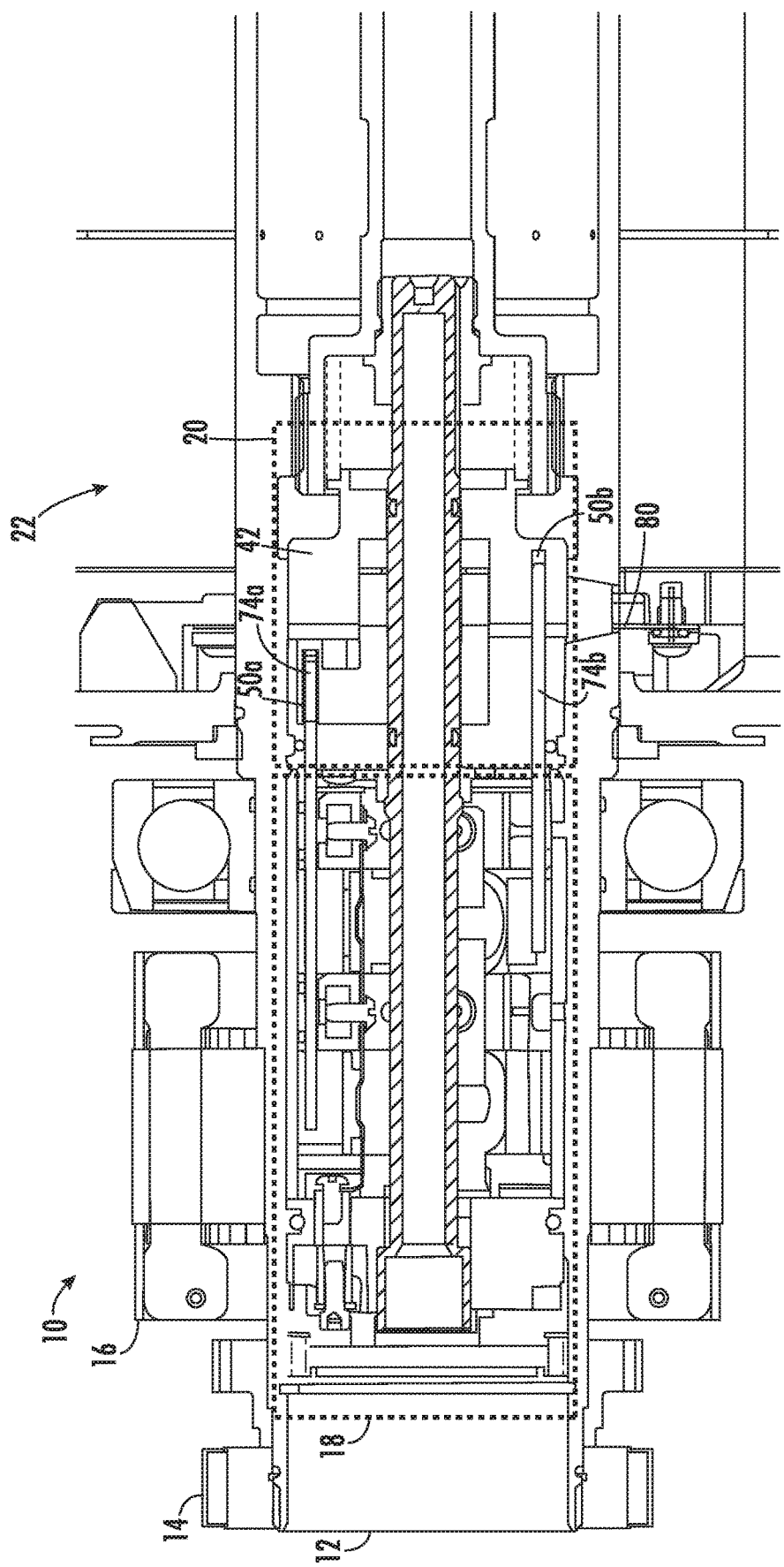
FIG. 9 is a cross-sectional view of rotating components included in a variable frequency generator, according to an embodiment of the present disclosure.

Referring now to FIG. 9, with continued reference to FIG. 1-8, a cross-sectional view of the assembled connection of the rectifier assembly 18 to the resistor pack assembly 20 is illustrated, according to an embodiment of the present disclosure. In particular, FIG. 9 illustrates the engagement of the second round contact bus bar 74b associated with the rectifier assembly 18 into the connection orifice 50b. The second round contact bus bar 74b extends away from the rectifier assembly 18 and engages the connection orifice 50b, making contact with the power band 73 located within the connection orifice 50b. Likewise, the first round contact bus bar 74a extends away from the rectifier assembly 18 and engages the connection orifice 50a, making contact with the power band 70 located within the connection orifice 50a.

In addition, the second round contact bus bar 74b extends through the connection orifice 50b and is engaged within the negative rail 42. The purpose of extending the second round contact bus bar 74b to make contact with the negative rail 42 is to provide an electrical path between the rectifier assembly 18 and ground (in this case, rotor shaft 12 is grounded). The grounded path allows built up static charge on the main field windings to safely discharge in a controlled manner. A ground path with resistance, limits the amount of static charge that can build up prior to discharge.

Figure 10:
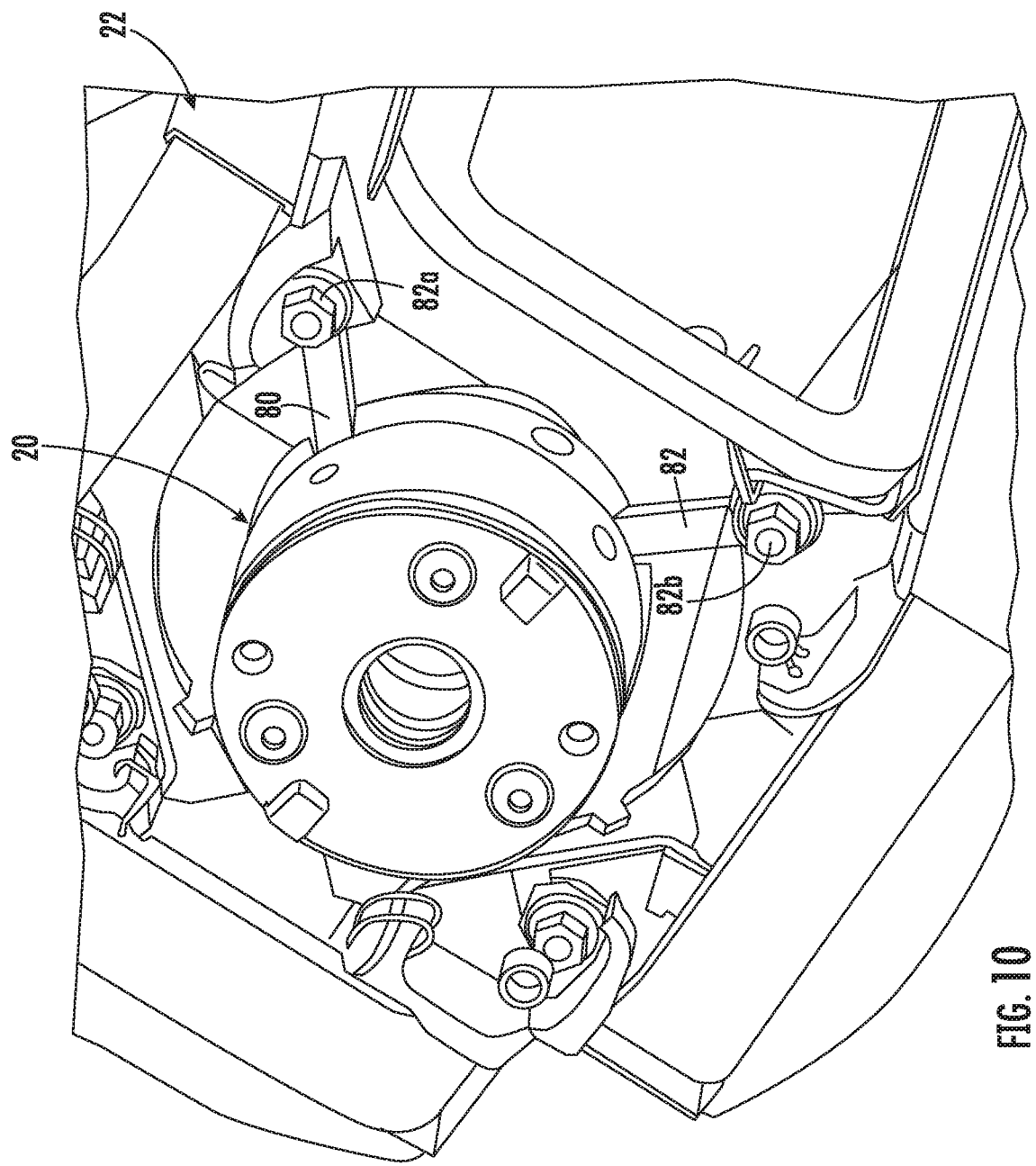
FIG. 10 is an orthogonal view of the assembled connection of the resistor pack assembly to the rotor field winding, according to an embodiment of the present disclosure.

Referring now to FIG. 10, with continued reference to FIG. 1-9, an orthogonal view of the resistor pack assembly 20 mounted within main the field winding 22 is illustrated, in accordance with an embodiment of the present disclosure. The first DC bus bar 80 and the second DC bus bar 82 are illustrated extending radially outward from the resistor pack assembly 20. The first DC bus bar 80 is secured to the main field winding 22 via the first nut 82a and the second DC bus bar 82 is secured to the main field winding 22 via the second nut 82b, respectively, for electrical connection to the main field winding 22.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A resistor pack assembly comprising:
   an anti-rotation housing that defines an internal cavity, the housing comprising:
      a first surface on one side of the internal cavity;
      a second surface opposite the first surface and on another side of the internal cavity; and
      one or more anti-rotation lugs extending away from the first surface;
   a positive rail located at least partially within the internal cavity;
   a negative rail having an inner circular face and an outer circular face located radially outward from the inner circular face; and
   an insulator ring interposed between the second surface of the anti-rotation housing and the outer circular face of the negative rail.

2. The resistor pack assembly of claim 1, wherein the anti-rotation housing further comprises:
   one or more counter bore holes extending from the first surface to the second surface.

3. The resistor pack assembly of claim 2, wherein each of the one or more counter bore holes further comprise:
   a first hole extending from the first surface to a seat; and
   a second hole extends from the seat to the second surface of the anti-rotation housing.

4. The resistor pack assembly of claim 3, wherein the first hole has a first diameter and the second hole has a second diameter, the first diameter being greater than the second diameter.

5. The resistor pack assembly of claim 3, further comprising:
   a washer located in the first hole; and
   a fastener extending through the washer, the first hole, and the second hole.

6. The resistor pack assembly of claim 5, wherein the washer is a Belleville washer.

7. A generator having a plurality of rotating components that rectify an alternating current (AC) voltage to a direct current (DC) voltage supplied to main field windings, the generator comprising:
   a rotor shaft having an inner diameter;
   a rectifier assembly located within the inner diameter of the rotor shaft and connected to convert the AC voltage to a rectified DC voltage supplied via a first round contact bus bar that extends axially away from the rectifier assembly and a second round contact bus bar that extends axially away from the rectifier assembly, the rectifier assembly comprising one or more notches; and
   a resistor pack assembly located axially adjacent to the rectifier assembly and within the inner diameter of the rotor shaft, wherein the resistor pack assembly receives the DC voltage supplied by the first round contact bus bar and the second round contact bus bar, wherein the resistor pack assembly communicates the DC voltage to a main field winding, and wherein the resistor pack assembly comprises:
      an anti-rotation housing that defines an internal cavity, the housing comprising:
         a first surface on one side of the internal cavity;
         a second surface opposite the first surface and on another side of the internal cavity; and
         one or more anti-rotation lugs extending away from the first surface, wherein the one or more anti-rotation lugs engage with the notches of the rectifier assembly.

8. The generator of claim 7, wherein the resistor pack assembly further comprises:
   a positive rail;
   a negative rail having an inner circular face and an outer circular face located radially outward from the inner circular face; and
   an insulator ring interposed between the second surface of the anti-rotation housing and the outer circular face of the negative rail.

9. The generator of claim 8, wherein the anti-rotation housing further comprises: an internal cavity extending from the second surface into the anti-rotation housing towards the first surface, wherein the positive rail is located at least partially within the internal cavity.

10. The generator of claim 7, wherein the anti-rotation housing further comprises:
    one or more counter bore holes extending from the first surface to the second surface.

11. The generator of claim 10, wherein each of the one or more counter bore holes further comprise:
    a first hole extending from the first surface to a seat; and
    a second hole extends from the seat to the second surface of the anti-rotation housing.

12. The generator of claim 11, wherein the first hole has a first diameter and the second hole has a second diameter, the first diameter being greater than the second diameter.

13. The generator of claim 11, wherein the resistor pack assembly further comprises:
    a washer located in the first hole; and
    a fastener extending through the washer, the first hole, and the second hole.

14. The generator of claim 13, wherein the washer is a Belleville washer.

15. An anti-rotation housing for use in a resistor pack assembly, the anti-rotation housing comprising:
    a first surface;
    a second surface opposite the first surface;
    an internal cavity defined between the first surface and second surface and configured to receive a resistor pack, the cavity extending from the second surface into the anti-rotation housing towards the first surface; and
    one or more anti-rotation lugs extending away from the first surface.

16. The anti-rotation housing of claim 15, further comprising:
   one or more counter bore holes extending from the first surface to the second surface.

17. The anti-rotation housing of claim 16, wherein each of the one or more counter bore holes further comprise:
   a first hole extending from the first surface to a seat; and
   a second hole extends from the seat to the second surface of the anti-rotation housing.

18. The anti-rotation housing of claim 17, wherein the first hole has a first diameter and the second hole has a second diameter, the first diameter being greater than the second diameter.

\* \* \* \* \*